United States Patent
Chen et al.

(10) Patent No.: US 6,727,012 B2
(45) Date of Patent: Apr. 27, 2004

(54) METHOD AND APPARATUS FOR GENERATING HYDROGEN INSIDE OF A FUEL CELL

(75) Inventors: Xuesong Chen, Brampton (CA); Ali Rusta-Sallehy, Richmond Hill (CA); David Frank, Scarborough (CA)

(73) Assignee: Hydrogenics Corporation, Mississauga (*) Notice: Subject to any disclaimer, the term of this patent is extended or adjusted under 35 U.S.C. 154(b) by 263 days.

(21) Appl. No.: 09/986,637

(22) Filed: Nov. 9, 2001

(65) Prior Publication Data

US 2003/0091877 A1 May 15, 2003

(51) Int. Cl.[7] .............................................. H01M 8/06
(52) U.S. Cl. ........................... 429/17; 429/19; 429/20
(58) Field of Search .............................. 429/17, 19, 20

(56) References Cited

U.S. PATENT DOCUMENTS

| | | | |
|---|---|---|---|
| 4,628,010 A | * 12/1986 | Iwanciow | 429/19 |
| 5,372,617 A | 12/1994 | Kerrebrock et al. | |
| 5,804,329 A | 9/1998 | Amendola | |
| 6,544,400 B2 | * 4/2003 | Hockaday et al. | 429/40 X |
| 6,592,741 B2 | * 7/2003 | Nakanishi et al. | 429/17 X |
| 2002/0182459 A1 | * 12/2002 | Hockaday et al. | 429/19 |
| 2003/0014917 A1 | * 1/2003 | Rusta-Sellehy et al. | 48/61 |
| 2003/0091876 A1 | * 5/2003 | Rusta-Sellehy et al. | 429/17 |
| 2003/0108832 A1 | * 6/2003 | Lumsden et al. | 431/2 |

FOREIGN PATENT DOCUMENTS

| | | | |
|---|---|---|---|
| WO | WO 01/51410 | 7/2001 | |
| WO | WO 01/85606 | * 11/2001 | ............. C01B/3/06 |

OTHER PUBLICATIONS

Aiello, R., Matthews M.A., Reger, D.L., and Collins, J.E., "Production of Hydrogen Gas From Novel Chemical Hydrides", International Association for Hydrogen Energy Elsevier Science Ltd., pp. 1103–1108, 1998.

Amendola, Steven C., Sharp–Goldman, Stefanie, L., Janjua, M. Saleem, Spencer, Nicole C., Kelly, Michael T., Petillo, Phillip J., and Binder, Michael, "A Safe, Portable, Hydrogen Gas Generator Using Aqueous Borohydride Solution and Ru Catalyst", International Journal of Hydrogen Energy, pp. 969–975, 2000.

* cited by examiner

*Primary Examiner*—Stephen J. Kalafut
(74) *Attorney, Agent, or Firm*—Bereskin & Parr

(57) ABSTRACT

An apparatus for generating hydrogen inside of a fuel cell is provided. The fuel cell comprises an anode having at least one inlet and optionally one outlet and, a cathode having at least one inlet and optionally one outlet. An electrolyte is disposed between the anode and the cathode, and a catalyst is provided in a chamber for catalyzing a reaction of a solution comprising a solvent and an at least one chemical hydride dissolved therein to generate hydrogen inside of the fuel cell. A method for generating hydrogen inside of a fuel cell is also disclosed.

42 Claims, 9 Drawing Sheets

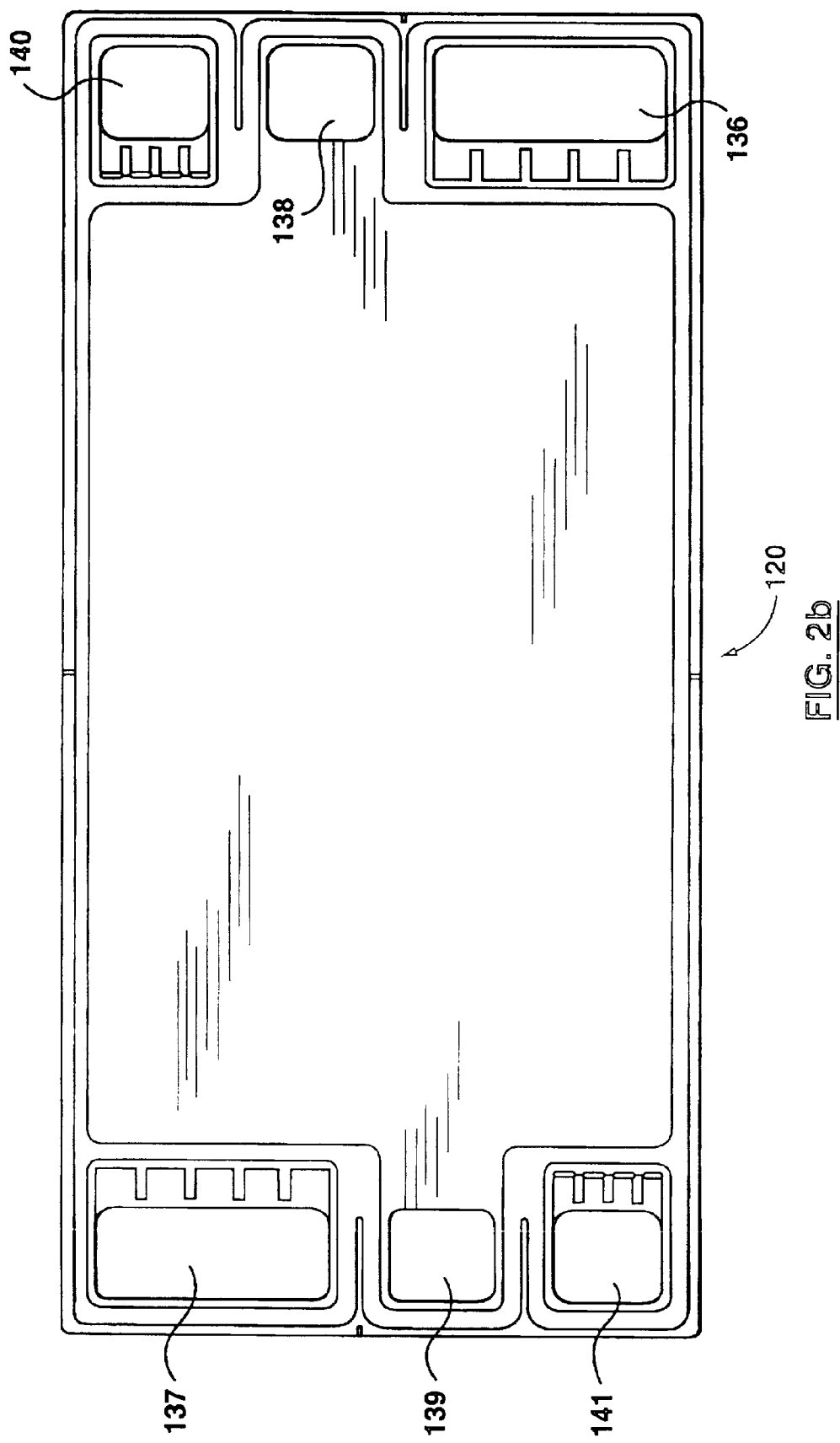

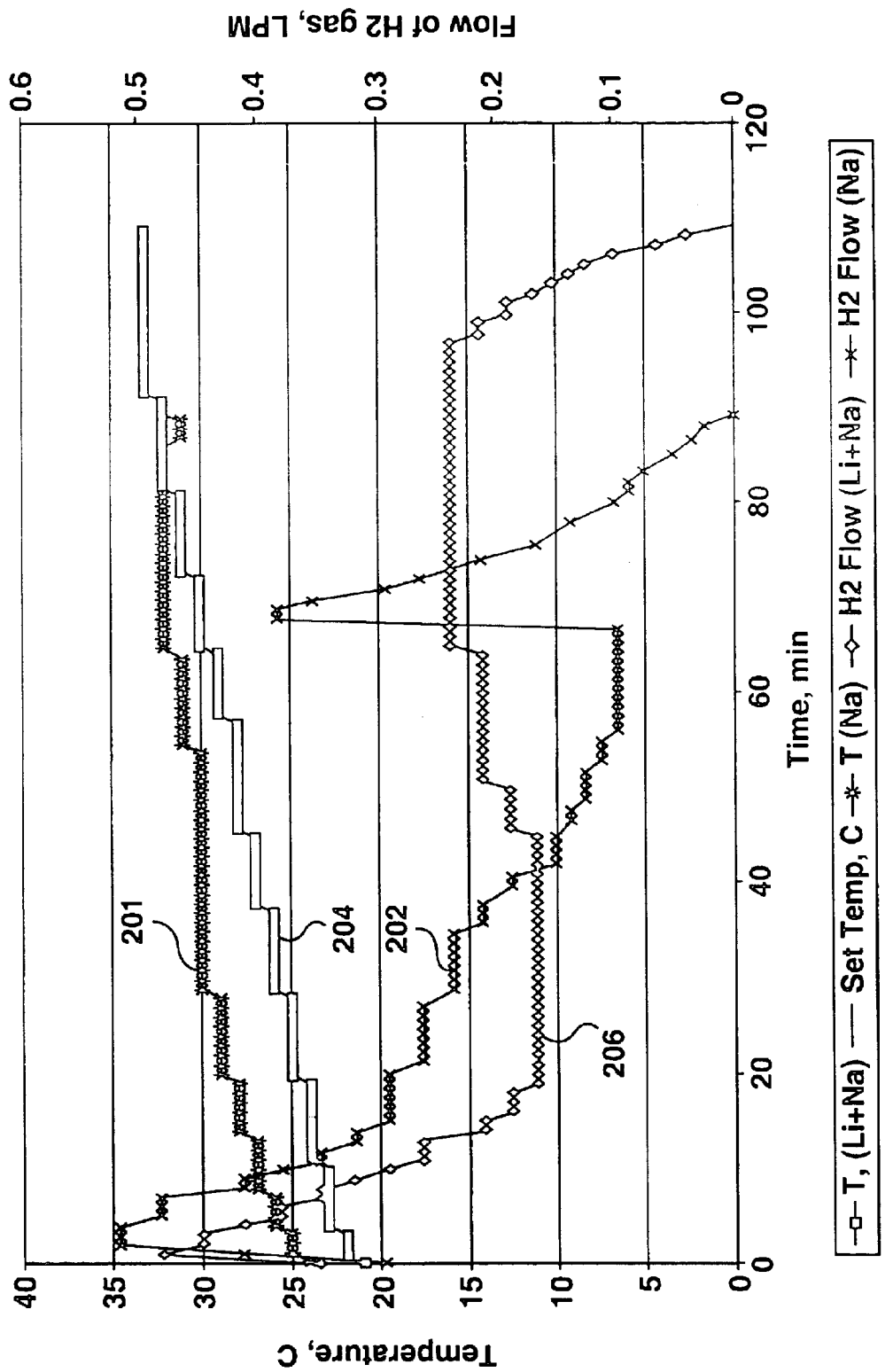

METHOD AND APPARATUS FOR GENERATING HYDROGEN INSIDE OF A FUEL CELL

FIELD OF THE INVENTION

The present invention relates to fuel cells. More particularly, the present invention relates to fuel cells provided with a hydrogen generation system.

BACKGROUND OF THE INVENTION

Fuel cells are seen as a promising alternative to traditional power generation technologies due to their low emissions, high efficiency and ease of operation. Fuel cells operate to convert chemical energy to electrical energy. Proton exchange membrane (PEM) fuel cells comprise an anode (oxidizing electrode), a cathode (reducing electrode), and a selective electrolytic membrane disposed between the two electrodes. In a catalyzed reaction, a fuel such as hydrogen, is oxidized at the anode to form cations (protons) and electrons. The ion exchange membrane facilitates the migration of protons from the anode to the cathode. The electrons cannot pass through the membrane, and are forced to flow through an external circuit, thus providing electrical current. At the cathode, oxygen reacts at the catalyst layer, with electrons returned from the electrical circuit, to form anions. The anions formed at the cathode react with the protons that have crossed the membrane to form liquid water as the reaction product. Additionally, since the reactions are exothermic, heat is generated within the fuel cell. The half-cell reactions at the two electrodes are as follows:

$$H_2 \rightarrow 2H^+ + 2e^- \quad (1)$$

$$1/2 O_2 + 2H^+ + 2e^- \rightarrow H_2O + HEAT \quad (2)$$

In practice, fuel cells are not operated as single units. Rather, fuel cells are connected in series, stacked one on top of the other, or placed side by side. A series of fuel cells, referred to as fuel cell stack, is normally enclosed in a housing. The fuel and oxidant are directed through manifolds to the electrodes, while cooling is provided either by the reactants or by a separate cooling medium. Also within the stack are current collectors, cell-to-cell seals and insulation. Piping and various instruments are externally connected to the fuel cell stack for supplying and controlling the fluid streams in the system. The stack, housing, and associated hardware make up the fuel cell unit.

Various types of fuel cells have been developed employing a broad range of reactants. For example, proton exchange membrane (PEM) fuel cells are one of the most promising replacements for traditional power generation systems. PEM fuel cells comprise an anode, a cathode, and a proton exchange membrane disposed between the two electrodes. Preferably, PEM fuel cells are fuelled by pure hydrogen gas, as it is electrochemically reactive and the by-products of the reaction are water and heat. However, these fuel cells require external supply and storage devices for the hydrogen. Hydrogen can be difficult to store and handle, particularly in non-stationary applications. Conventional methods of storing hydrogen include liquid hydrogen, compressed gas cylinders, dehydrogenation of compounds, chemical adsorption into metal alloys, and chemical storage as hydrides. However, such storage systems tend to be hazardous, dangerous, expensive and bulky.

Other types of fuels have been proposed, including hydrogen-containing materials such as methanol. In some conventional systems, external reformers are employed to liberate hydrogen from the hydrogen-containing materials. The liberated hydrogen is then introduced into the fuel cell. However, the use of external reformers complicates the construction of the system, and results in a substantial loss in system efficiency. In other conventional systems, hydrogen-containing fuels may be supplied directly to the fuel cells, i.e. supplied unreformed to the fuel cell anodes. Once inside the fuel cell, the hydrogen-containing fuel may be directly oxidized or internally reformed, and subsequently oxidized to generate electricity. This occurs in some high temperature fuel cells, such as solid oxide fuel cells. These systems do not require a separate external reformer, and utilize fuels that are easier to handle than hydrogen. However, pure hydrogen typically offers better performance, and is generally more environmentally friendly than most hydrogen-containing fuels. Moreover, high temperature fuel cells operate at a minimum temperature of 600° C. These high temperatures are required to reform the hydrogen-containing materials prior to carrying out the fuel cell reactions. As such, hydrogen-containing materials are generally unsuitable for conventional PEM fuel cells that typically operate around 80° C.

Another method of generating and storing hydrogen has been recently proposed. This method uses a chemical hydride solution, such as $NaBH_4$, as a hydrogen storage medium. Generally, chemical hydride reacts with water in the presence of a catalyst to generate hydrogen, as shown in the equation below:

$$NaBH_4 + 2H_2O \rightarrow 4H_2 + NaBO_2 + HEAT \quad (3)$$

The chemical hydride solution acts as both the hydrogen carrier and the storage medium. Ruthenium, Cobalt, Platinum or any alloys thereof may be used to catalyze the above reaction. It is noted that hydrogen is liberated from both the borohydride solution and the water. The borohydride solution is relatively cheap, and is much easier and safer to handle and transport than liquid or pressurized hydrogen. As a result, there are some advantages associated with using borohydride as a method of storing hydrogen as a fuel for use in fuel cells.

There are several conventional hydrogen generation systems that utilize chemical hydrides. One type of hydrogen generation system comprises a closed vessel for mixing chemical hydride powder together with water. The water is introduced into the vessel through an inlet. The vessel contains a mechanical stirring device to ensure adequate contact between the powder and the water, and to prevent the powder from clumping. The hydrogen gas is removed through an outlet in the vessel, and is supplied directly to the fuel cell. These systems tend to be inefficient since the stirring mechanism consumes energy, and increases the overall weight and complexity of the system. Furthermore, the noise generated by the stirring is undesirable. In addition, the reaction rate tends to be low, making the hydrogen generation unpredictable and thus hard to control. The systems also tend to be large and cumbersome.

Another type of hydrogen generation system employs a chemical hydride solution. In this system, an aqueous chemical hydride solution is introduced into a catalyst bed to generate hydrogen for use in fuel cells. However, these chemical hydride systems still require a separate hydrogen generation subsystem for generating and supplying hydrogen to the fuel cell system. As such, the systems tend to be complex, costly, and inefficient.

There remains a need for a fuel cell system that utilizes pure hydrogen and that contains a compact and simple subsystem for generating the hydrogen. More particularly, such a fuel cell system should desirably be equipped to liberate hydrogen from a chemical hydride solution in view of its known properties, and subsequently utilize the pure hydrogen in a fuel cell reaction.

SUMMARY OF THE INVENTION

In accordance with the present invention, there is provided a fuel cell stack, comprising:
  at least one fuel cell comprising an anode with a fuel inlet port for a hydrogen containing fuel, a cathode with an oxidant inlet port;
  at least one chamber for a solution comprising a solvent and at least one chemical hydride dissolved therein, and having a chamber inlet and a chamber outlet for the solution and a catalyst within at least one chamber for catalyzing reaction of the solution to generate hydrogen.

The solution used in the system can comprise a solvent comprising water and an at least one chemical hydride comprising borohydride. The at least one chemical hydride can be in the form of $Mb_xH_y$, in which M is a metal. Specifically, the at least one chemical hydride can comprise one or a combination of: $NaBH_4$, $LiBH_4$, $KBH_4$, or $RbH_4$. Alternatively, the at least one chemical hydride can comprise $NH_3BH_3$. Preferably, the solution comprises a solvent comprising water and an at least one chemical hydride comprising $NaBH_4$ and less than 5% by weight $LiBH_4$. Preferably, the solution further comprises a freezing point depressing agent to ensure the system works properly under low temperatures. Preferably, the freezing point depressant agent comprises glycerol. Preferably, the concentration of glycerol is between 0–5% by weight, and more preferably the concentration of glycerol is 1% by weight. Preferably, the solution further comprises an alkaline additive. The alkaline additive can comprise one or a combination of: LiOH, KOH, and NaOH. More preferably, the alkaline additive comprises 0.1% NaOH by weight.

In accordance with another aspect of the present invention, there is provided an energy system, comprising:
  (a) a fuel cell stack capable of generating hydrogen internally and comprising:
    at least one fuel cell having an anode with a hydrogen inlet port, a cathode including an oxidant inlet port, and at least one chamber with a chamber inlet port and a chamber outlet port, and a catalyst in each chamber for catalyzing reaction of a solution comprising a solvent and an at least one chemical hydride dissolved therein to generate hydrogen;
  (b) a storage means for storing the solution;
  (c) a circulation loop, at least connected to the storage means, each chamber inlet port and each chamber outlet port, for circulating the solution from the storage means through the fuel cell stack;
  (d) a supplying path, connected to the hydrogen inlet port of each fuel cell anode and each chamber outlet port, for supplying hydrogen generated inside the chamber back to the fuel cell;
wherein the fuel cell stack generates electricity and water from hydrogen and an oxidant.

The energy system can further include a recovery means for recovering the water generated in the fuel cell, and supplying the recovered water to the solution during the reaction as the at least one chemical hydride is consumed in use. Preferably, the recovery means comprises a gas-liquid separator.

In accordance with a further aspect of the present invention, there is provided a method for generating and supplying hydrogen to a fuel cell, the method comprising:
  (a) providing a supply of solution comprising a solvent and an at least one chemical hydride dissolved therein;
  (b) supplying the solution to a catalyst in the fuel cell to catalyze the reaction of the solvent and the at least one chemical hydride to generate hydrogen;
  (c) removing the solution comprising hydrogen, by-products, and unreacted solution from the fuel cell;
  (d) separating the hydrogen from the solution; and
  (e) delivering the generated hydrogen to the fuel cell.

The method can further comprise the steps of:
  (a) recovering water from consumption of hydrogen in the fuel cell; and
  (b) supplying the recovered water to the supply of the solution, to compensate for water consumed during the reaction of the solution to generate hydrogen, and to promote maintenance of concentration levels for products of the reaction at acceptable levels, thereby delaying the onset of any precipitation of products tending to limit the generation of hydrogen.

The method can additionally comprise the step of adjusting the temperature of the solution upstream of the fuel cell. For example, the temperature of the solution can be either raised or lowered upstream of the fuel cell.

The internal hydrogen generation fuel cell according to the present invention can be incorporated into a safe and compact fuel cell system, eliminating the need for bulky storage and/or separate reformer subsystems. Moreover, the chemical hydride solution stream absorbs and removes heat from the fuel cell stack. Accordingly, a separate cooling loop may no longer be required. Furthermore, the hydrogen gas may be humidified by the water vapor from the chemical hydride solution. Therefore, a separate humidification system for the anode may no longer be required. Accordingly, the system is simplified, thereby resulting in improved system efficiency and enhanced power density. Since chemical hydride reactions of the present invention can take place at subzero temperatures, the fuel cell system of the present invention can start at lower temperatures than conventional fuel cells.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which:

FIG. 2b shows a schematic view of the rear face of the anode flow field plate of the fuel cell according to the present invention;

FIG. 4 shows a graph of temperature and hydrogen gas generation versus time for a $NaBH_4$ solution and a $LiBH_4$—$NaBH_4$ solution.

DETAILED DESCRIPTION OF THE INVENTION

Figure 1:
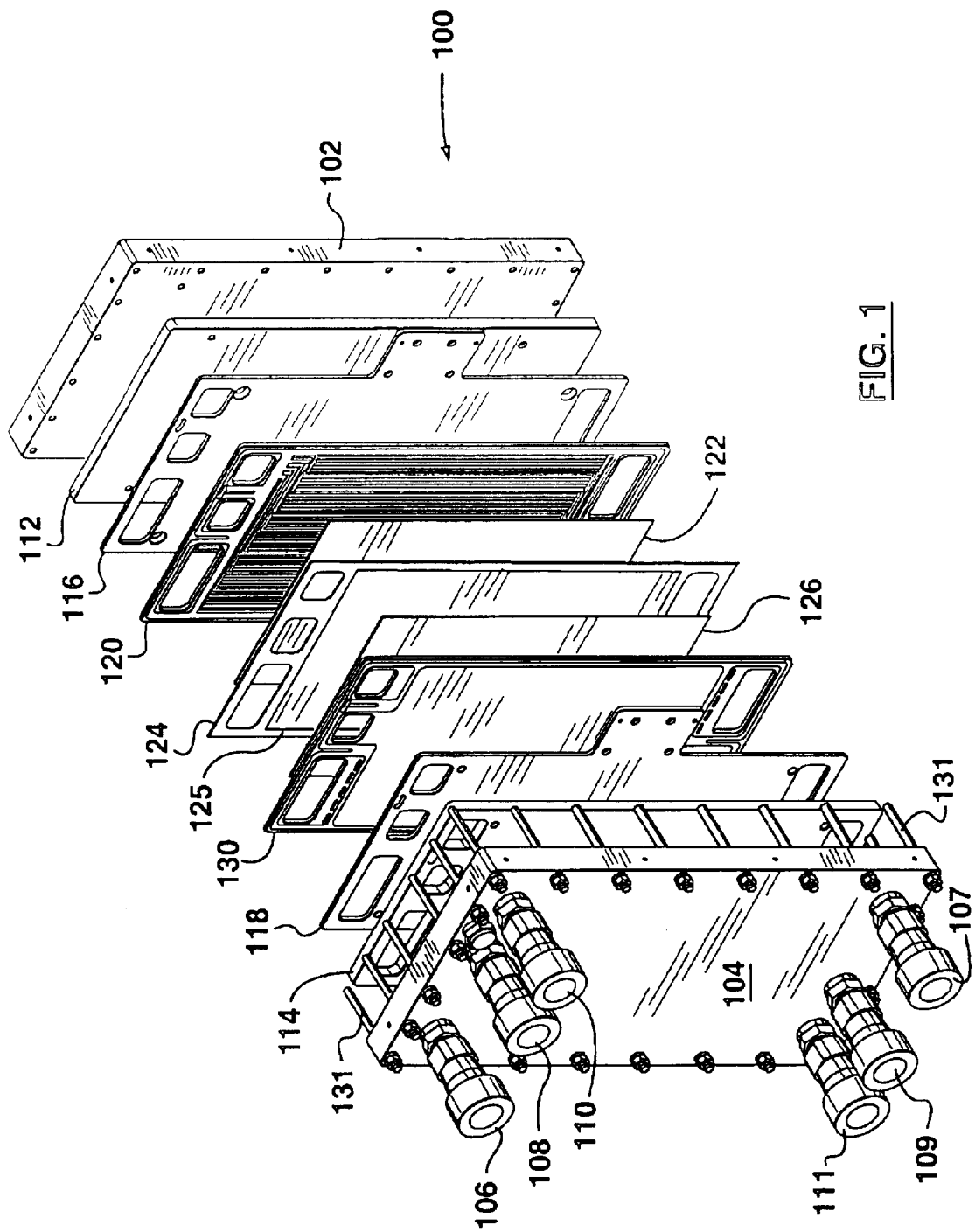
FIG. 1 shows an exploded perspective view of a fuel cell unit located within a fuel cell stack according to the present invention.

Referring first to FIG. 1, this shows an exploded perspective view of a single fuel cell unit 100 located within a fuel cell stack according to the present invention. It is to be understood that while a single fuel cell unit 100 is detailed below the fuel cell stack, in known manner comprises a plurality of fuel cells stacked together. The fuel cell unit 100 comprises an anode flow field plate 120, a cathode flow field plate 130, and a membrane electrode assembly (MEA) 124 disposed between the anode and cathode flow field plates 120, 130. Each reactant flow field plate has an inlet region, an outlet region, and open-faced channels to fluidly connect the inlet to the outlet, and provide a way for distributing the reactant gases to the outer surfaces of the MEA 124. The MEA 124 comprises a solid electrolyte (i.e. a proton exchange membrane) 125 disposed between an anode catalyst layer (not shown) and a cathode catalyst layer (not shown). Preferably, a first gas diffusion media (GDM) 122 is disposed between the anode catalyst layer and the anode flow field plate 120, and a second GDM 126 is disposed between the cathode catalyst layer and the cathode flow field plate 130. The GDMs 122, 126 facilitate the diffusion of the process gas, either the fuel or oxidant, to the catalyst surfaces of the MEA 124. Furthermore, the GDMs enhance the electrical conductivity between each of the anode and cathode flow field plates 120, 130 and the membrane 125.

In a catalyzed reaction, a fuel such as pure hydrogen, is oxidized at the anode catalyst layer of the MEA 124 to form protons and electrons. The proton exchange membrane 125 facilitates migration of the protons from the anode catalyst layer to the cathode catalyst layer. The electrons cannot pass through the proton exchange membrane 125, and are forced to flow through an external circuit (not shown), thus providing an electrical current. At the cathode catalyst layer of the MEA 124, oxygen reacts with electrons returned from the electrical circuit to form anions. The anions formed at the cathode catalyst layer of the MEA 124 react with the protons that have crossed the membrane 125 to form liquid water as the reaction product.

Still referring to FIG. 1, hereinafter the designations "front" and "rear" with respect to the anode and cathode flow field plates 120, 130 indicate their orientation with respect to the MEA 124. Thus, the "front" face indicates the side facing towards the MEA 124, while the "rear" face indicates the side facing away from the MEA 124. A first current collector plate 116 abuts against the rear face of the anode flow field plate 120. Similarly, a second current collector plate 118 abuts against the rear face of the cathode flow field plate 130. The current collector plates 116, 118 collect the current from the flow field plates 120, 130, and are connected to an external electrical circuit (not shown). First and second insulator plates 112, 114 are located immediately adjacent the first and second current collector plates 116, 118, respectively. First and second end plates 102, 104 are located immediately adjacent the first and second insulator plates 112, 114, respectively. Pressure may be applied on the end plates 102, 104 to press the unit 100 together. Moreover, sealing means may be provided between each pair of adjacent plates. Preferably, a plurality of tie rods 131 may also be provided. The tie rods 131 are screwed into threaded bores in the cathode endplate 104, and pass through corresponding plain bores in the anode endplate 102. In known manner, fastening means, such as nuts, bolts, washers and the like are provided for clamping together the fuel cell unit 100 and the entire fuel cell stack.

Still referring to FIG. 1, the endplates 102, 104 are provided with a plurality of connection ports for the supply of various fluids. Specifically, the second endplate 104 has first and a second air connection ports 106, 107, first and second chemical hydride connection ports 108, 109, and first and second hydrogen connection ports 110, 111. As will be understood by those skilled in the art, the MEA 124, the first and second gas diffusion media 122, 126, the anode and cathode flow field plates 120, 130, the first and second current collector plates 116, 118, the first and second insulator plates 112, 114, and the first and second end plates 102, 104 have three inlets near one end and three outlets near the opposite end thereof, which are in alignment to form fluid channels for air as an oxidant, a chemical hydride solution, and hydrogen. Also, it is not essential that all the outlets be located at one end, i.e., pairs of flows could be counter current as opposed to flowing in the same direction. Although not shown, it will be understood that the various ports 106–111 are fluidly connected to distribution channels that extend along the length of the fuel cell unit 100.

All of the chemical hydride connection ports, and inlets and outlets on all of the various plates employed in the fuel cell unit 100 are insulated with a non-electrically conductive insulating material, such as a polymer, rubber, silicon, polypropylene, or ceramic. This prevents the ions in the chemical hydride solution from providing an alternate flow path for the electrons, and thus 'shorting' the adjacent fuel cells in the fuel cell stack. The insulation material can be applied in the desired areas by conventional coating techniques, deposition techniques or injection molding methods.

The front face of the anode flow field plate 120 has a flow field 132 comprising a plurality of open-faced channels for introducing hydrogen to the anode catalyst layer of the MEA 124. Similarly, the front face of the cathode flow field plate 130 has a flow field 142 comprising a plurality of open-faced channels for introducing air to the cathode catalyst layer of the MEA 124. In one embodiment, the rear face of the cathode flow field plate 130 has a flow field 144 comprising a recess for introducing chemical hydride into the fuel cell unit 100. Alternatively, the recess is provided on the rear face of the anode flow field plate for introducing chemical hydride into the fuel cell unit 100. In yet another alternative embodiment, both the rear faces of the anode and cathode flow field plates 120, 130 have flow fields comprising recesses for introducing chemical hydride into the fuel cell unit 100.

The chemical hydride utilized in the present invention is in the liquid phase, i.e. in the form of a solution. The present invention uses the chemical hydride solution as a coolant, for absorbing and carrying away excess heat from the fuel cell unit 100. Accordingly, as this involves replacing a conventional liquid coolant, often water, for the chemical hydride solution, the structure of the fuel cell unit 100 of the present invention does not have to be significantly modified from conventional fuel cell designs.

Figure 2A:
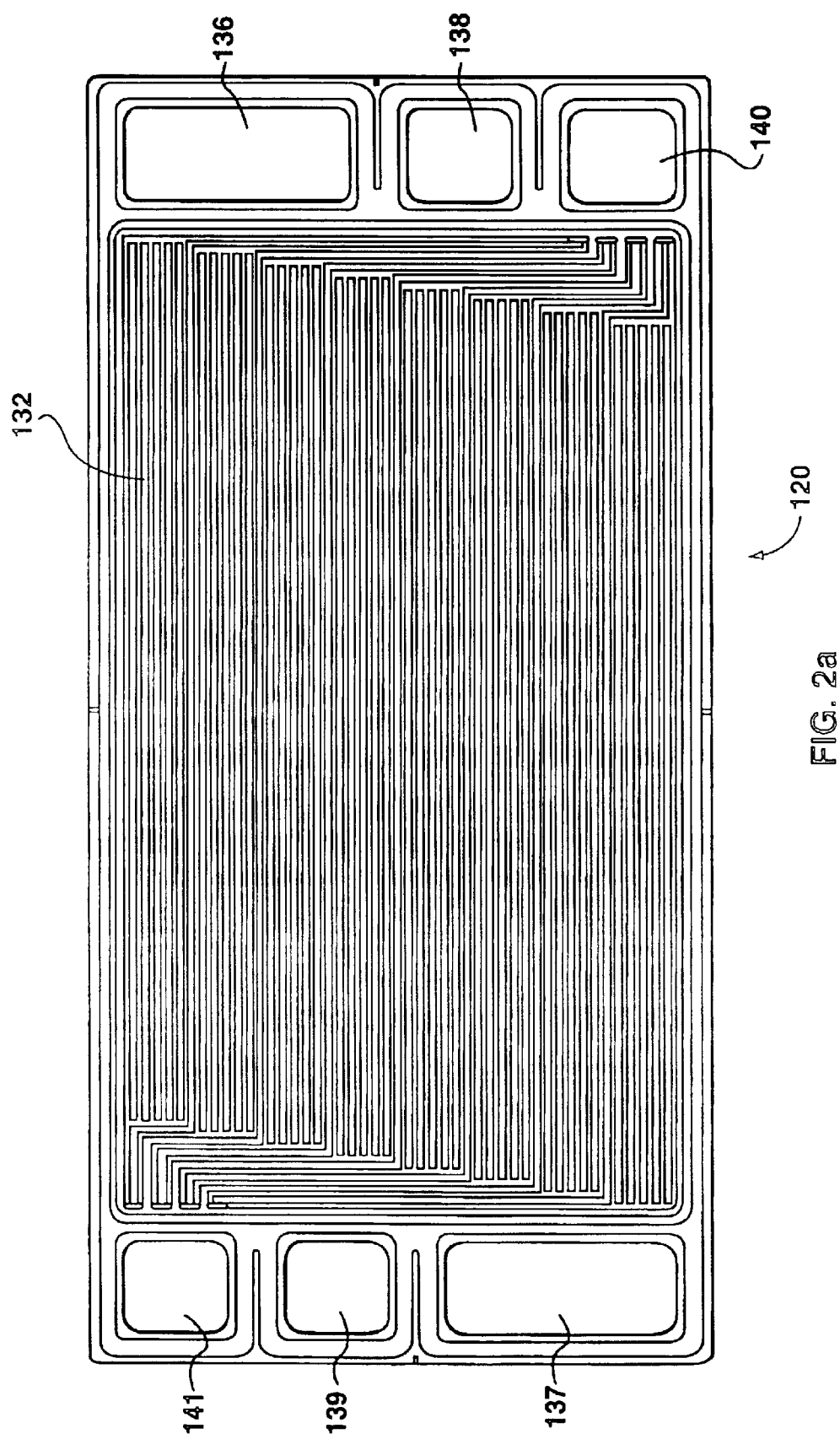
FIG. 2a shows a schematic view of the front face of the anode flow field plate of the fuel cell according to the present invention.

Referring now to FIG. 2a, this shows the front face of the anode flow field plate 120. The anode flow field plate 120 has three inlets near one end thereof, namely an anode air inlet 136, an anode chemical hydride inlet 138, and an anode hydrogen inlet 140, in fluid communication with the first air connection port 106, the first chemical hydride connection port 108, and the first hydrogen connection port 110, respectively. The anode flow field plate 120 has three outlets near the opposite end, namely an anode air outlet 137, an anode chemical hydride outlet 139 and an anode hydrogen outlet 141, in fluid communication with the second air connection port 107, the second chemical hydride connection port 109, and the second hydrogen connection port 111, respectively.

In FIG. 2a, the front face of the anode flow field plate 120 is provided with a flow field 132 comprising a plurality of open-faced channels. This flow field 132 fluidly connects the anode hydrogen inlet 140 to the anode hydrogen outlet 141. Hydrogen enters the anode hydrogen inlet 140, and flows along the channels in the flow field 132. At least a portion of the hydrogen diffuses across the first GDM 122 and reacts at the anode catalyst layer of the MEA 124 to form protons and electrons. The protons then migrate across the membrane 125 towards the cathode catalyst layer. The unreacted hydrogen continues to flow along the flow field 132, and ultimately exits the anode flow field plate 120 via the anode hydrogen outlet 141. The front face of the anode flow field plate 120 of the fuel cell unit 100 may be of any standard design known in the fuel cell art.

Now referring to FIG. 2b, this shows the rear face of the anode flow field plate 120. In the preferred embodiment, the rear face of the anode flow field plate 120 is smooth, and is not provided with any flow fields. This is an improvement over conventional fuel cell designs, which usually require flow fields to direct the coolant across the anode 120, by simplifying the structure of the plate and hence reducing the manufacture cost. Optionally a catalyst for chemical hydride reaction is provided.

Figure 3A:
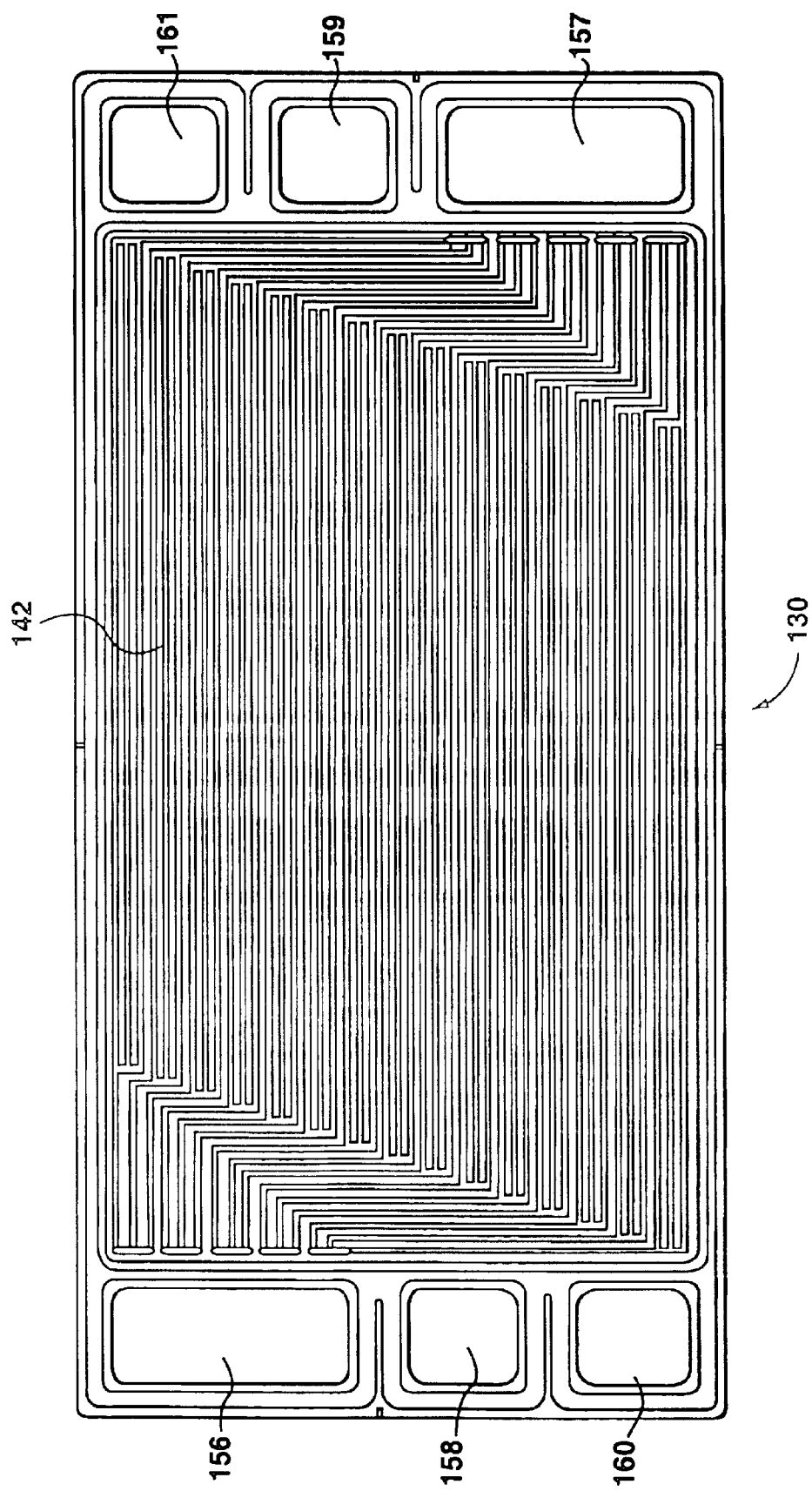
FIG. 3a shows a schematic view of the front face of the cathode flow field plate of the fuel cell according to the present invention.

Referring now to FIG. 3a, this shows the front face of the cathode flow field plate 130. The cathode flow field plate 130 has three inlets near one end thereof, namely a cathode air inlet 156, a cathode chemical hydride inlet 158, and a cathode hydrogen inlet 160, in fluid communication with the first air connection port 106, the first chemical hydride connection port 108, and the first hydrogen connection port 110, respectively. The cathode flow field plate 130 has three outlets near the opposite end, namely a cathode air outlet 157, a cathode chemical hydride outlet 159, and a cathode hydrogen outlet 161, in fluid communication with the second air connection port 107, the second chemical hydride connection port 109, and the second hydrogen connection port 111, respectively.

In FIG. 3a, the front face of the cathode flow field plate 130 is provided with a flow field 142 comprising a plurality of open-faced channels. The flow field 142 fluidly connects the cathode air inlet 156 to the cathode air outlet 157. Air enters through the first air connection port 106, flows through the cathode air inlet 156, and flows along the channels in the flow field 142. At least a portion of the oxygen diffuses across the second GDM 126 and reacts at the cathode catalyst layer with the electrons returned from the external circuit to form anions. The anions then react with the protons that have migrated across the MEA 124 to form liquid water and heat. The unreacted air continues to flow along the flow field 142, and ultimately exits the cathode flow field plate 120 via the cathode air outlet 157. The front face of the cathode flow field plate 130 of the fuel cell unit 100 may be of any standard design known in the fuel cell art.

In the anode flow field plate 120 and the cathode flow field plate 130, the various inlets and outlets 136–141 and 156–161 comprise apertures aligned with one another to form six ducts or channels extending through the fuel stack and, at their ends connected to respective ones of the ports 106–111.

Figure 3B:
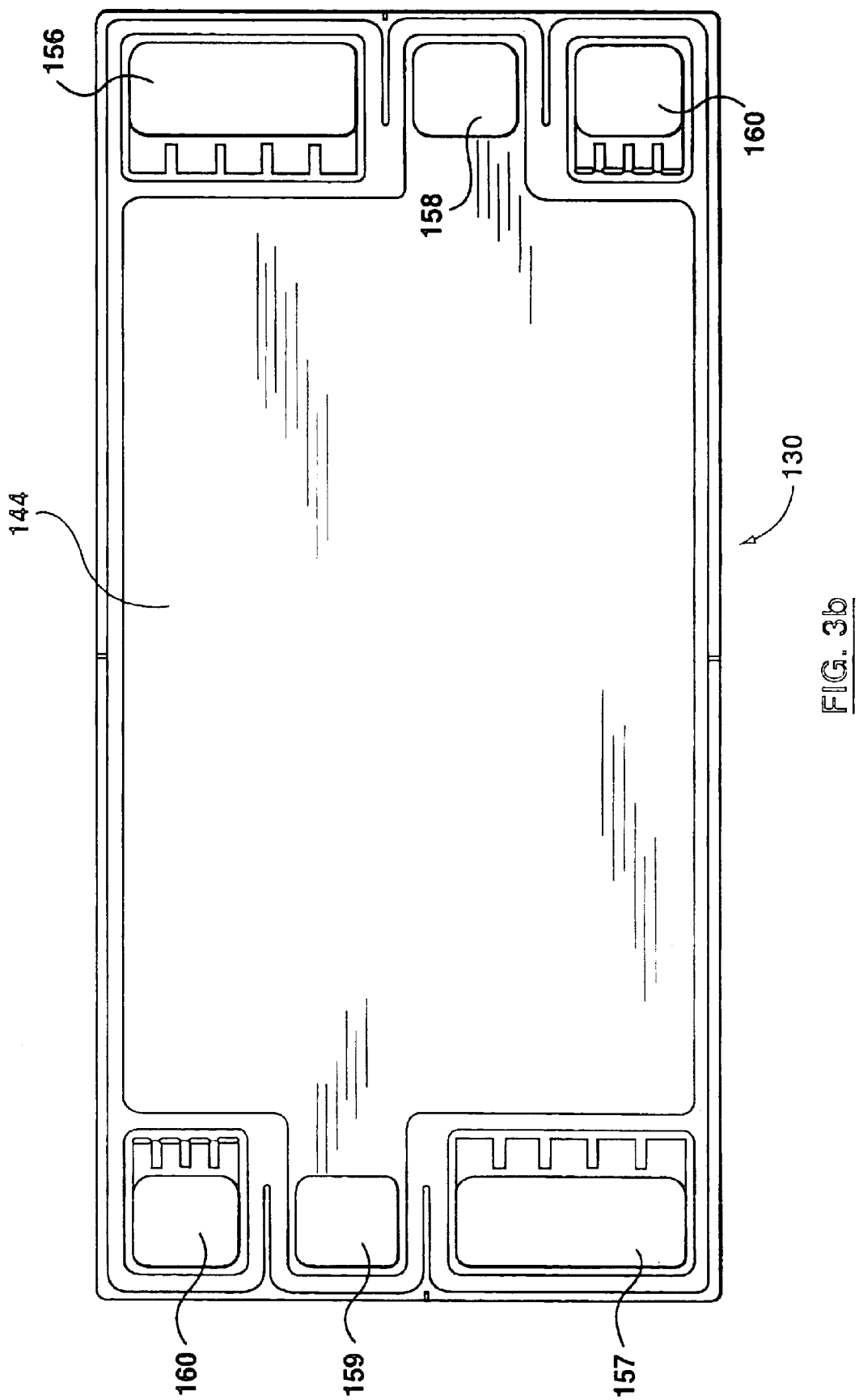
FIG. 3b shows a schematic view of the rear face of the cathode flow field plate of the fuel cell according to the present invention.

Referring now to FIG. 3b, this shows the rear face of the cathode flow field plate 130. In the preferred embodiment, the rear face of the cathode flow field plate 130 is provided with a chemical hydride flow field 144 in the form of a recess. This recess contains a catalyst (not shown) to catalyze the chemical hydride reaction to generate hydrogen. The recesses of flow field plates 120, 130 of adjacent fuel cells define a common coolant chamber between the adjacent fuel cells. The chemical hydride solution enters through the first chemical hydride connection port 108, flows through the cathode chemical hydride inlet 158, and flows across the recess 144. At least a portion of the chemical hydride solution reacts in the recess 144 in a catalyzed reaction to form gaseous hydrogen, and this will be described in more detail below. The entrained hydrogen gas bubbles, the by-products (including borate), and the unreacted chemical hydride solution exits the cathode flow field plate 130 via cathode chemical hydride outlet 159.

The chemical hydride solution used in the system can comprise a borohydride water solution. The solute of the solution can be in the form of $Mb_xH_y$, in which M is a metal. Specifically, the solute comprise one or any combination of: $NaBH_4$, $LiBH_4$, $KBH_4$, or $RbH_4$. Alternatively, the solute can comprise $NH_3BH_3$. Preferably, the chemical hydride solution is a water solution in which the solute comprises $NaBH_4$ and less than 5% $LiBH_4$ by weight. $L_iBH_4$, a lighter material, has a much higher hydrogen density than $NaBH_4$. However, the by-product of the $LiBH_4$ and water reaction, $LiBO_2$, only has a solubility of 5%. Furthermore, the reaction rate of the $LiBH_4$ solution tends to be much slower than the reaction rate of the $NaBH_4$ solution under similar conditions. Thus, an addition of less than 5% $LiBH_4$ by weight to the $NaBH_4$ solution will increase the hydrogen density of the solution, without causing precipitation of the by-product.

FIG. 4 shows a graph of temperature of the solution and the hydrogen gas generation versus time for a $NaBH_4$ solution and a solution comprising $NaBH_4$ and 5% $LiBH_4$ by weight. The temperatures of the $NaBH_4$ solution and the $NaBH_4/LiBH_4$ solution are indicated at 201 and 204, corresponding curves for hydrogen flow rate, are indicated at 202 and 206 respectively. The temperature of the solution is directly related to the amount of heat given off during the exothermic reaction at a single point in time. Thus, the rate of temperature increase is an indirect way to monitor the reaction rate of the solution. Generally, the graph suggests that the $LiBH_4$—$NaBH_4$ solution has a slower rate of temperature increase, and thus a more stable hydrogen generation rate than the pure $NaBH_4$ solution. Accordingly, this makes the $LiBH_4$—$NaBH_4$ solution more desirable, as the hydrogen generation rate of this solution is more predictable and controllable. A hydrogen generation system must be capable of responding in real time to the fuel (hydrogen) needs of the fuel cell. This ability is referred to as the load following ability. Since the $LiBH_4$—$NaBH_4$ solution has a high hydrogen density and a controllable hydrogen generation rate, the solution has a good load following ability, and is ideally suited for this type of system.

Figure 5:
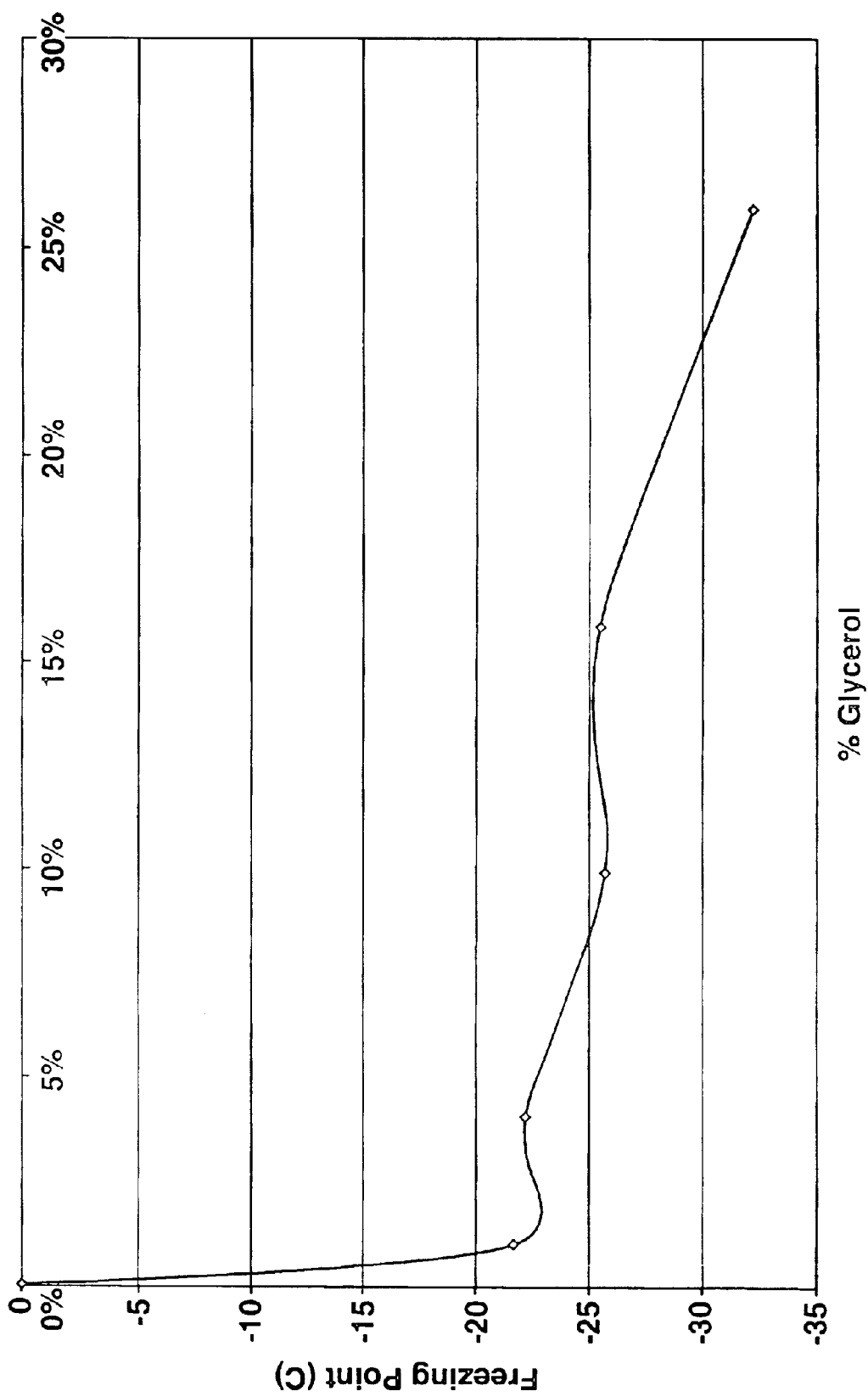
FIG. 5 shows a graph of freezing point temperature of the chemical hydride solution versus the concentration of freezing point depressing agent in the solution.

Preferably, the chemical hydride solution further comprises a freezing point depressing agent to ensure that the system works properly under low temperatures. The freezing point depressing agent can comprise glycerol. FIG. 5 shows a graph of freezing point temperature of the chemical hydride solution versus the concentration of freezing point depressing agent in the solution. The graph suggests that as the concentration of glycerol is increased, the freezing point of the solution is significantly lowered. For example, with a glycerol concentration of approximately 1% by weight, the solution is stable and can operate at temperatures as low as −22° C.

Figure 6:
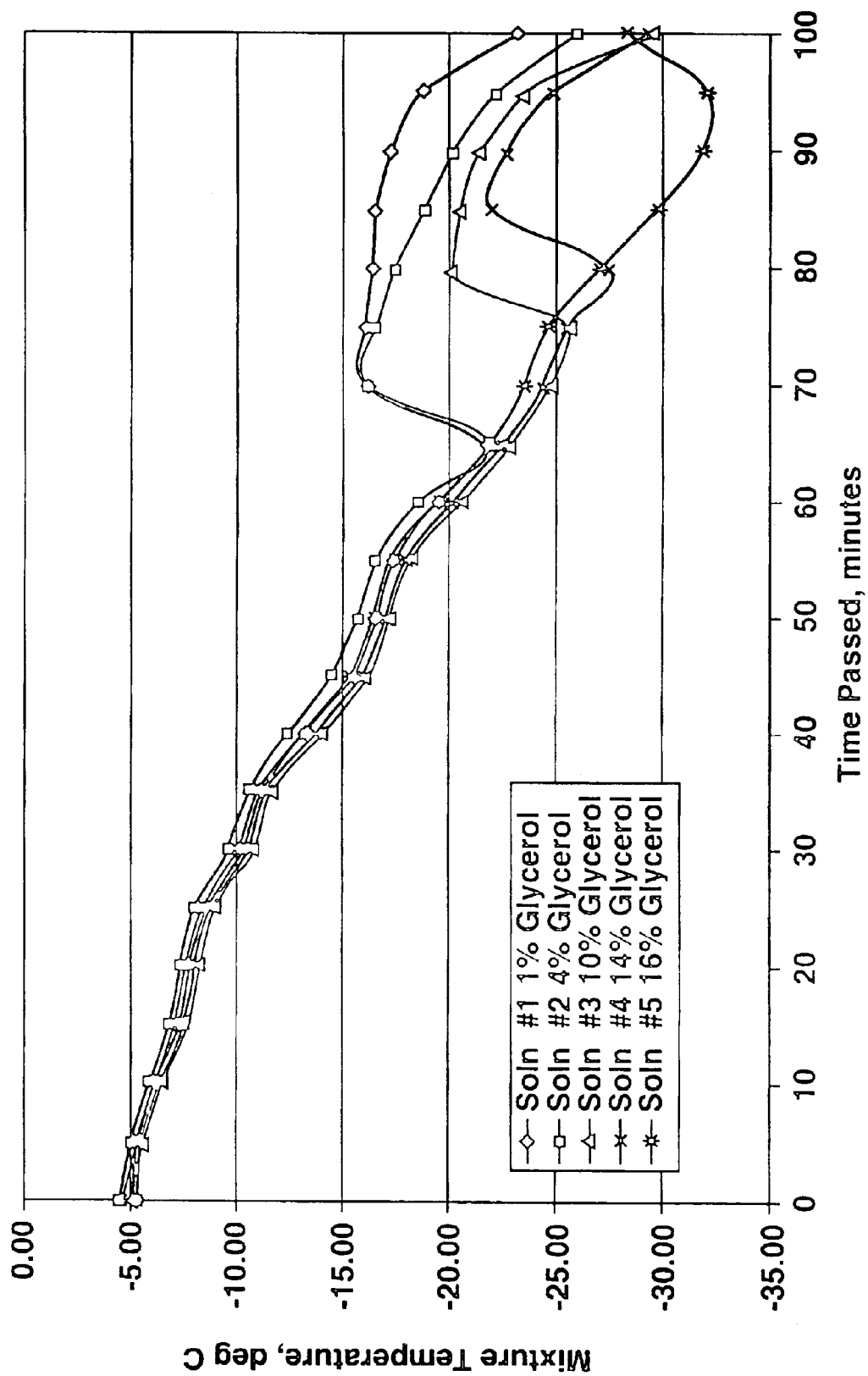
FIG. 6 shows a graph of the chemical hydride solution temperature versus time for chemical hydride solutions with different concentrations of freezing point depressing agents.

FIG. 6 shows a graph of the temperature of the solution versus time for chemical hydride solutions with different concentrations of freezing point depressing agents. When a solution freezes, crystals are formed. This crystallization process is exothermic. Thus, the freezing point of the solution can be identified on the graph by a subtle drop in temperature followed by a sharp increase in temperature. The graph suggests that as the concentration of glycerol is increased, the freezing point of the solution is significantly lowered. For example, with a glycerol concentration of approximately 16% by weight, the solution can operate at temperatures as low as −30° C. However, as the concentration of glycerol in the solution is increased, the solubility of the borohydride decreases. Accordingly, the hydrogen density of the chemical hydride solution decreases with an increase in the concentration of glycerol. Preferably, the concentration of glycerol is lower than 5% by weight, and more preferably the concentration of glycerol is about 1% by weight. A glycerol concentration of 1% by weight does not noticeably compromise the borohydride solubility, but effectively depresses the freezing point of the solution to about 22° C.

Preferably, the solution further comprises alkaline additives such as LiOH, KOH, and NaOH. The purpose of these additives is to provide a slightly alkaline environment, which significantly slows the chemical hydride reaction when not in use, thereby lengthening the shelf life of the solution. More preferably, the alkaline additive is 0.1% NaOH by weight. A concentration of 0.1% NaOH by weight is adequate in raising the pH enough to stabilize the solution.

Figure 7:
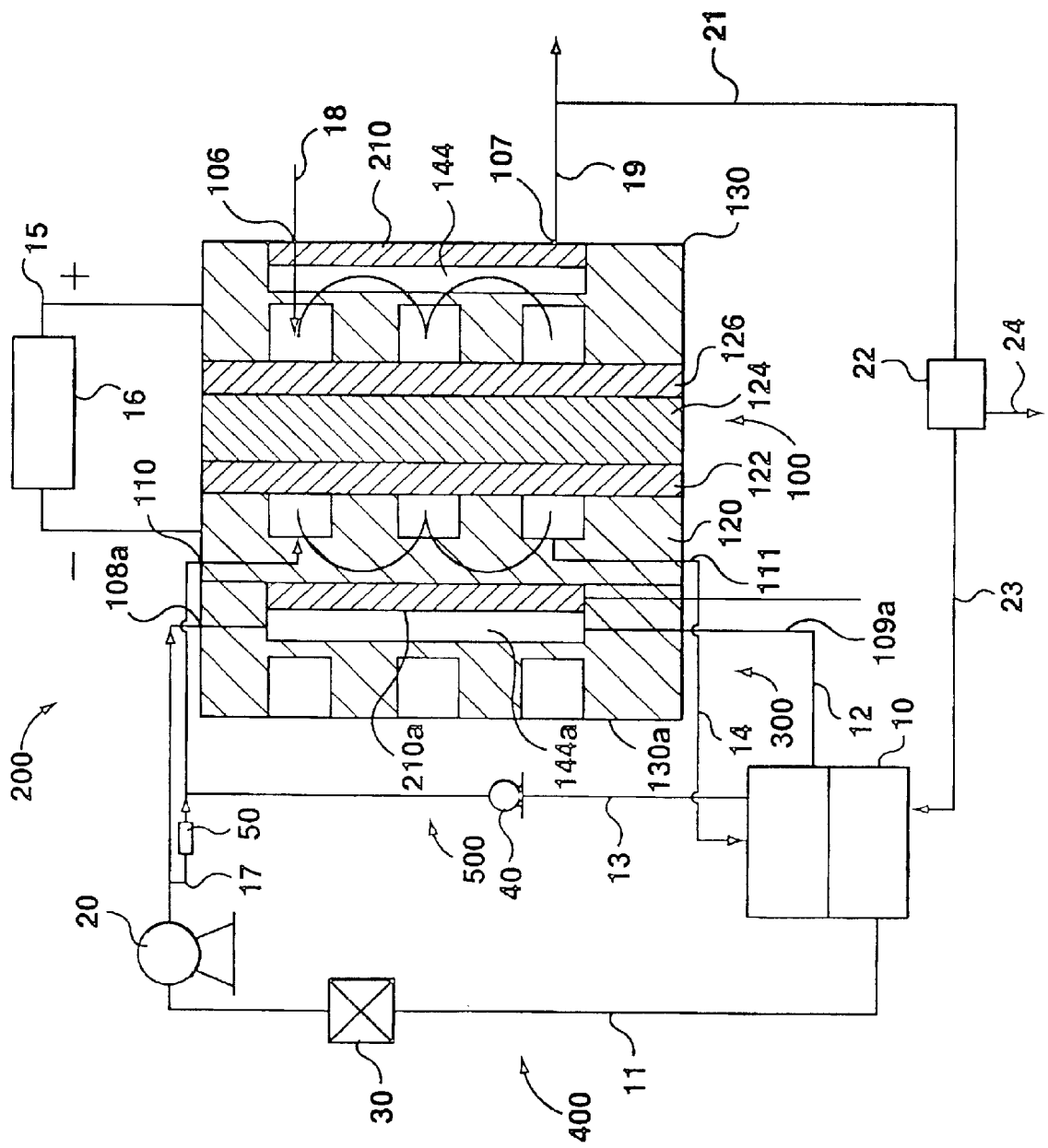
FIG. 7 shows a schematic flow diagram of a fuel cell system according to the present invention.

Referring now to FIG. 7, this shows a schematic flow diagram of a fuel cell system 200 according to the present invention. As noted, a fuel cell stack comprises a plurality of fuel cells stacked in series. For simplicity, in FIG. 7, the fuel cell system 200 shown comprising a first fuel cell unit 100 abutted against a second adjacent fuel cell unit 300 (only partially shown) in a fuel cell stack, and it will be understood that each pair of fuel cells form a similar arrangement. A chemical hydride circulation loop 400, a hydrogen circulation loop 500, an external electrical circuit 15, and a load 16 are also shown. The elements of the first fuel cell unit 100 are identical to the elements of the second fuel cell unit 300, and other fuel cells (not shown) would also usually be identical. Accordingly, reference numbers of the elements of the second fuel cell unit 300, which correspond to elements of the first fuel cell unit 100, will be denoted by the suffix 'a'.

Referring to FIG. 7, this shows a chemical hydride circulation loop 400. Chemical hydride is stored in a container 10 in the form of a solution. When hydrogen is required, the chemical hydride solution is supplied to the first chemical hydride connection port 108a through line 11 by means of a first pump 20 (the various ports are shown schematically in FIG. 7). Optionally, a heat exchanger 30 may be disposed in line 11, for enhancing the thermal management of the overall system 200. The solution then passes through the cathode chemical hydride inlet (not shown), and into the recess 144a where the catalyzed chemical reactions take place. As a result of the chemical reactions, hydrogen gas bubbles become entrained in the solution. The solution, including hydrogen gas bubbles, the borate by-product, and the unreacted chemical hydride solution, flows through the cathode chemical hydride outlet (not shown), exits the stack via the second chemical hydride connection port 109a, and returns to the container 10 via line 12. Preferably, the container 10 is a gas-liquid separator. As such, the hydrogen gas bubbles are effectively separated from the chemical hydride solution. It is to be understood that separate hydrogen storage vessel (not shown) may also be provided after the hydrogen bubbles are separated.

Still referring to FIG. 7, there is also shown a hydrogen circulation loop or supplying path 500. Preferably, hydrogen is stored in the container 10 in the form of a gas. When hydrogen is required, the hydrogen gas is supplied to the first hydrogen connection port 110 through line 13 by means of a second pump 40. From here, the hydrogen enters the anode hydrogen inlet 140 (FIG. 2), and flows along the channels in the flow field 132 on the front face of the anode flow field plate 120. At least a portion of the hydrogen diffuses across the first GDM 122 (FIG. 1), and reacts at the anode catalyst layer to form protons and electrons. The protons then migrate across the membrane 125 of the MEA 124 towards the cathode catalyst layer. The unreacted hydrogen continues to flow along the flow field 132, and ultimately exits the anode flow field plate 120 via the anode hydrogen outlet 141. From here, the unreacted hydrogen exits the stack via the second hydrogen connection port 111 (FIGS. 2a and 7), and returns to the container 10 via line 14.

Still referring to FIG. 7, air is supplied to the first air connection port 106 through a line 18. From here, the air enters the cathode air inlet 156 (FIG. 3), and flows along the channels in the flow field 142 on the front face of the cathode flow field plate 120. At least a portion of the air diffuses across the second GDM 126 (FIG. 1), and reacts at the cathode catalyst layer to form anions. The anions then react with the protons that have migrated across the MEA 124 to form liquid water and heat. The unreacted air continues to flow along the flow field 142, and ultimately exits the cathode flow field plate 120 via the cathode air outlet 157 (FIG. 3). From here, the unreacted air and water exits the stack via the second air connection port 107 and exits from the fuel cell via line 19.

The system 200 may be designed to recover water from the cathode exhaust gas in line 19, and recycle it back into the container 10 to prevent the concentration of by-products in the solution from exceeding the solubility of the by-products. Specifically, this prevents the by-products from precipitating out of the solution, and clogging the fuel cell unit 100.

The by-product of the hydrogen generation reaction, in this embodiment, $NaBO_2$, is less soluble then the reactant $NaBH_4$. Specifically, $NaBO_2$ is only approximately 20% soluble, whereas $NaBH_4$ is approximately 40% soluble. Therefore, as hydrogen is generated, the concentration of $NaBO_2$ in the solution stored in the container 10 increases until it reaches the solubility of $NaBO_2$. If the reaction continues beyond this point, $NaBO_2$ will precipitate out of the solution into the container 10. As such, the solid $NaBO_2$ may be supplied to the fuel cell, causing it to clog. In such instances, the hydrogen generation rate decreases significantly, and an insufficient amount of hydrogen is produced. In conventional systems, this problem is overcome by keeping the initial $NaBH_4$ concentration lower than the solubility of $NaBO_2$, that is, below 20%. However, this concentration is considerably lower than the solubility of $NaBH_4$, and results in a limited hydrogen storage density. In the present invention, this problem is overcome by continuously introducing water into the container 10. As hydrogen is generated, the increase of $NaBO_2$ concentration in the solution is counteracted by the increase of solvent, i.e. water. Therefore, the initial concentration of the hydride in the present invention can be set higher than that of conventional systems, thus achieving a higher hydrogen storage density.

Water is continuously introduced into the container 10. In known manner, water is generated on the cathode side of the fuel cell, and is exhausted from the fuel cell together with the unreacted oxidant via line 19. The exhaust mixture of air and water then flows through a line 21 to a gas-liquid separator 22, in which the air and water are separated and including a vent or outlet 24 for air. The recovered water is then introduced through a line 23 into the chemical hydride solution in the container 10. Generally, the recovery of the exhaust water can enable the initial concentration of the chemical hydride to be increased by at least 50% more than in conventional systems.

The catalyzed reaction of the chemical hydride will be described in more detail below. The recess 144*a* is provided on the rear face of the cathode flow field plate 130*a*, and a layer of catalyst 210*a* is disposed in the recess 144*a*. As the chemical hydride solution flows through the recess 144*a*, it comes into contact with the catalyst layer 210*a*. The chemical hydride solution, for example borohydride, reacts with water under ambient conditions to generate hydrogen and the by-product borate. The catalyst layer 210*a* may include, but are not limited to: ruthenium, cobalt, platinum, or any alloys thereof. Preferably, the catalyst layer 210*a* is in the form of a foam. Foam catalysts maximize the surface area available for chemical reactions, thus achieving a fast rate of reaction. The incoming borohydride solution flushes the products, including the entrained hydrogen gas, borate, and the unreacted borohydride solution out of the recess 144*a*. This prevents a build-up of borate in the fuel cell unit 100.

Alternatively, the catalyst layer 210*a* may be applied to the surface of the recess 144*a* using conventional coating techniques, deposition techniques, or any other methods known in the art. Alternatively, the catalyst may be supplied in the form of a plurality of small pellets with a high surface area to volume ratio, and placed within the recess 144*a* during the assembly of the fuel cell stack.

The hydrogen generation reactions and the fuel cell reactions are both exothermic. The circulating borohydride solution also doubles as a coolant, absorbing and removing excess heat from the fuel cell stack. The heat exchanger 30 may optionally be employed to further regulate the temperature, and thus enhance the thermal management of the system 200. With this set-up, a separate, main coolant loop may no longer be required. This simplifies the design of the system 200, and reduces the associated cost of production.

Upon shutting down the system 200, the unreacted chemical hydride solution typically stays behind in the recess 144*a* and continues to generate hydrogen in the presence of the catalyst. In most cases, the unreacted chemical hydride solution will eventually exit the recess 144*a* by the force of gravity. However, this process can be very lengthy. In some cases, at least a portion of the unreacted solution may remain behind in the recess 144*a*, and may not be expelled by gravity. This results in poor shut down characteristics of the system 200. Thus, to ensure that the system 200 can be shutdown quickly, a switching means 50, such as a solenoid valve or the like, is provided in line 17 which fluidly connects the chemical hydride loop 400 to the hydrogen loop 500. Specifically, the switching means 50 is located upstream of the fuel cell stack. When the fuel cell stack is in operation, the switching means 50 is in the closed position, and the chemical hydride solution and hydrogen are circulated in the manner described above.

The shut-down sequence will now be described in detail below. Upon shutting down the system 200, the solenoid valve 50 or the like opens, and the first pump 20 is turned off. The second pump 40 remains on to pump hydrogen from the hydrogen loop 500 to the chemical hydride loop 400 via line 17. As the hydrogen gas flows through the chemical hydride loop 400, the remaining solution is effectively and quickly expelled from the fuel cell stack.

Specifically, hydrogen exits container 10 via line 13, as driven by the second pump 40. From here, the hydrogen enters line 17, passes through switching means 50, and flows into line 11 of the chemical hydride loop 400. Next, the hydrogen enters the fuel cell stack via chemical hydride connection port 108*a*, passes through the cathode chemical hydride inlet, and flows into recess 144*a*. The movement of the hydrogen gas through the recess 144*a* expels the remainder of the solution out of the fuel cell stack. The hydrogen and any remaining solution flows through the cathode chemical hydride outlet, exits the stack via the second chemical hydride connection port 109*a*, and is returned to the container 10 via line 12.

The internal hydrogen generation fuel cell according to the present invention can be incorporated into a safe and compact fuel cell system, eliminating the need for bulky storage and/or separate reformer subsystems. Moreover, the chemical hydride solution stream absorbs and removes heat from the fuel cell stack. Accordingly, a separate cooling loop may no longer be required. Furthermore, as the hydrogen gas is liberated from chemical hydride water solution and is extracted from a gas/liquid separation vessel, it must necessarily be humidified by the water vapor from the chemical hydride solution. Therefore, a separate humidification system for the anode may no longer be required. Accordingly, the system is simplified, thereby resulting in improved system efficiency and enhanced power density. Since chemical hydride reactions of the present invention can take place at sub-zero temperatures, the fuel cell system of the present invention can start at lower temperatures than conventional fuel cells.

As can be appreciated from the detailed description above, the present invention does not require substantial changes to the structure of conventional fuel cell stacks. However, the use of chemical hydride to generate hydrogen inside of a fuel cell stack simplifies the fuel cell system 200, and improves the power density thereof. The hydrogen generation reactions preferably occur at temperatures between about 0° C. to 100° C., and more preferably at about 60° C. These temperatures fall within the operational range of conventional PEM fuel cells. Thus, chemical hydride hydrogen generation systems can be incorporated into a fuel cell stack without changing the structure significantly.

The spirit of the invention relates to the generation of hydrogen inside of the fuel cell by reacting chemical hydride with water. It should be appreciated that the shape and arrangement of the fuel cell stacks of the present invention are not limited to those disclosed in the above description. For example, the chemical hydride flow path including the recess 144 does not have to be located only on the rear face of the cathode flow field plate. It may also be provided only on the rear face of anode flow field plate, or on the rear faces of both anode and cathode flow field plates While the above description constitutes the preferred embodiments, it will be appreciated that the present invention is susceptible to modification and change without departing from the fair meaning of the proper scope of the accompanying claims. For example, the present invention might have applicability in other types of fuel cells that employ pure hydrogen as a fuel, which include but are not limited to, alkaline, molten-carbonate, and phosphoric acid. Additionally, the number and arrangement of the components in the system might be varied, but may still fall within the scope and spirit of the claims.

What is claimed is:

1. A fuel cell stack capable of internal hydrogen generation, the fuel cell stack comprising:
    at least one fuel cell comprising an anode with a fuel inlet port for a hydrogen containing fuel, a cathode with an oxidant inlet port;
    at least one chamber for a solution comprising a solvent and at least one chemical hydride dissolved therein, and having a chamber inlet and a chamber outlet for the solution and a catalyst within at least one chamber for catalyzing reaction of the solution to generate hydrogen.

2. A fuel cell stack as claimed in claim 1, which includes at least two fuel cells and wherein said at least one chamber comprises at least one chamber between and adjacent pair of fuel cells.

3. A fuel cell stack as claimed in claim 2 wherein said at least one chamber comprises a chamber provided between each adjacent pair of fuel cells, each chamber having a respective chamber inlet and chamber outlet and including the catalyst within the chamber.

4. A fuel cell stack as claimed in claim 2, wherein each chamber is formed by a recess provided on a rear side of the cathode of one of the fuel cells.

5. A fuel cell stack as claimed in claim 2, wherein each chamber is formed by a recess provided on a rear side of the anode of one of the fuel cells.

6. A fuel cell stack as claimed in claim 2, wherein each chamber is formed by a recess provided on a rear side of the cathode of a fuel cell and a facing recess provided on a rear side of the anode of an adjacent fuel cell.

7. A fuel cell stack as claimed in any of claims 4, 5 or 6, wherein the catalyst comprises a layer of catalyst foam.

8. A fuel cell stack as claimed in any of claims 4, 5, or 6, wherein the catalyst comprises a layer of material that is coated onto the surface of the chamber.

9. A fuel cell stack as claimed in any of claims 4, 5 or 6, wherein the catalyst comprises a plurality of pellets disposed within the chamber.

10. A fuel cell stack as claimed in claim 1, wherein the flow paths for the said solution within the fuel cell stack, both upstream and downstream of the said chamber, are lined with a non-electrically conductive insulating material.

11. A fuel cell stack as claimed in claim 10, wherein the non-electrically conductive insulating material comprises a polymer.

12. A fuel cell stack as claimed in claim 10, wherein the non-electrically conductive insulating material comprises a rubber.

13. A fuel cell stack as claimed in claim 10, wherein the non-electrically conductive insulating material comprises a silicon.

14. A fuel cell stack as claimed in claim 10, wherein the non-electrically conductive insulating material comprises a polypropylene.

15. A fuel cell stack as claimed in claim 10, wherein the non-electrically conductive insulating material comprises a ceramic.

16. A fuel cell stack as claimed in claims 1, 3, 6 and 10, wherein the anode of each fuel cell includes a fuel outlet port and the cathode of each fuel cell includes an oxidant outlet port.

17. An energy generating system, comprising:
    (a) a fuel cell stack capable of generating hydrogen internally and comprising:
        at least one fuel cell having an anode with a hydrogen inlet port, a cathode including an oxidant inlet port, and at least one chamber with a chamber inlet port and a chamber outlet port, and a catalyst in at least one chamber for catalysing reaction of a solution comprising a solvent and an at least one chemical hydride dissolved therein to generate hydrogen;
    (b) a storage means for storing the solution;
    (c) a circulation loop, at least connected to the storage means, each chamber inlet port and each chamber outlet port, for circulating the solution from the storage means through the fuel cell stack;
    (d) a supplying path, connected to the hydrogen inlet port of each fuel cell anode and each chamber outlet port, for supplying hydrogen generated inside the chamber back to the fuel cell;
wherein the fuel cell stack generates electricity and water from hydrogen and an oxidant.

18. An energy system as claimed in claim 17, wherein the cathode of each fuel cell includes an oxidant outlet port, and wherein the energy system further comprises:
    a recovery means connected between each oxidant outlet port and the circulation loop for recovering the water generated in the fuel
cell and supplying the recovered water to the solution during the reaction as the at least one chemical hydride is consumed in use.

19. An energy system as claimed in claim 18, wherein the recovery means comprises a gas-liquid separator, for separating oxidant gas from the water.

20. An energy system as claimed in claim 19, wherein the storage means includes another gas-liquid separator interconnected in the circulation loop and having an outlet for hydrogen connected to the supplying path, and wherein the hydrogen generated in each chamber is separated from the chemical hydride solution in the separator, upstream of the fuel cell in the supplying path.

21. An energy system as claimed in claim 20, which includes a switch means connected between the supplying path and each chamber inlet port and operable to enable hydrogen gas to be passed through each chamber to flush out the chamber.

22. An energy system as claimed in claim 17, which includes a heat exchanger located upstream of each chamber in the circulation loop, for adjusting the temperature of the solution.

23. An energy system as claimed in claim 22, which includes a heat exchanger connected in series in the first supplying path with the chamber, for cooling the solution.

24. An energy system as claimed in claim 17, wherein each fuel cell includes, as an electrolyte, a proton exchange membrane.

25. An energy system as claimed in claim 17, wherein the solution comprises a solvent comprising water and an at least one chemical hydride comprising borohydride.

26. An energy system as claimed in claim 25, wherein the solution comprises a solvent comprising water and an at least one chemical hydride in the form of $MB_xH_y$, wherein M is a metal.

27. An energy system as claimed in claim 26, wherein the at least one chemical hydride is selected from the group consisting of: $NaBH_4$, $LiBH_4$, $KBH_4$, and $RbBH_4$.

28. An energy system as claimed in claim 17, wherein the solution comprises a solvent comprising water and at least one chemical hydride comprising $NaBH_4$ and less than 5% by weight of $LiBH_4$.

29. An energy system as claimed in claim 17, wherein the solution comprises a solvent comprising water and an at least one chemical hydride comprising $NH_3BH_3$.

30. An energy system as claimed in claim 17, wherein the solution further comprises a freezing point depressing agent.

31. An energy system as claimed in claim 30, wherein the freezing point depressing agent comprises glycerol.

32. An energy system as claimed in claim 31, wherein the concentration of glycerol is less than 5% by weight.

33. An energy system as claimed in claim 32, wherein the concentration of glycerol is about 1% by weight.

34. An energy system as claimed in claim 17, wherein the solution further comprises an alkaline additive.

35. An energy system as claimed in claim 34, wherein the alkaline additive is selected from the group consisting of: LiOH, KOH, and NaOH.

36. An energy system as claimed in claim 35, wherein the alkaline additive comprises 0.1% NaOH by weight.

37. A method of generating and supplying hydrogen to a fuel cell, the method comprising:
   (a) providing a supply of solution comprising a solvent and an at least one chemical hydride dissolved therein;
   (b) supplying the solution to a catalyst in the fuel cell to catalyze the reaction of the solvent and the at least one chemical hydride to generate hydrogen;
   (c) removing the solution comprising hydrogen, by-products, and unreacted solution from the fuel cell;
   (d) separating the hydrogen from the solution; and
   (e) delivering the generated hydrogen to the fuel cell.

38. A method as claimed in claim 37, further comprising the steps of:
   (f) recovering water from the exhaust of the fuel cell; and
   (g) supplying the recovered water to the supply of the solution, to compensate for water consumed during the reaction of the solution to generate hydrogen, and to promote maintenance of concentration levels for products of the reaction at acceptable levels, thereby delaying the onset of any precipitation of products tending to limit the generation of hydrogen.

39. A method as claimed in claim 37, further comprising the step of adjusting the temperature of the solution upstream of the fuel cell.

40. A method as claimed in claim 37, wherein the temperature of the solution is raised upstream of the fuel cell.

41. A method of operating a fuel cell as claimed in claim 37, wherein the temperature of the solution is lowered upstream of the fuel cell.

42. A method as claimed in claim 37, further comprising the steps of:
   (h) stopping the supply of the solution to the fuel cell;
   (i) flushing hydrogen through the solution flow path to expel the remainder of the solution from the fuel cell upon shut-down of the system.

* * * * *